United States Patent [19]

Zepkowski

[11] 4,336,950
[45] Jun. 29, 1982

[54] SLED

[76] Inventor: John Zepkowski, R.D. 2, Canton, Pa. 17724

[21] Appl. No.: 184,755

[22] Filed: Sep. 8, 1980

[51] Int. Cl.³ .............................................. B62B 13/12
[52] U.S. Cl. ..................................... 280/16; 280/21 A
[58] Field of Search ...................... 280/21 A, 21 R, 22, 280/16

[56] References Cited

U.S. PATENT DOCUMENTS 3,107,923 10/1963 Nuss .................................. 280/21 A
3,370,862  2/1968 Huffnagle ......................... 280/21 R
4,036,506  7/1977 Scheib .............................. 280/21 A

FOREIGN PATENT DOCUMENTS 64503  4/1914 Austria ................................ 280/16
179480  9/1954 Austria ............................. 280/21 A
717699 10/1966 Italy .................................. 280/21 A Primary Examiner—David M. Mitchell

[57] ABSTRACT

A sled having a frame supporting front and rear pairs of skis. The front portion of each front ski is pivotally mounted at the bottom of a front strut so that it can tilt about its longitudinal axis and can pivot about the axis of the front strut. The rear portion is mounted for pivotal rotation about a rear strut which is affixed to a strut support that pivots about an axis that is parallel to the longitudinal axis of the sled. During turning, the rear struts swing opposite to the direction of the turn, thereby causing the front skis to tilt and bite into the snow. The rear skis are tied to the front skis so that they also swing out and bite into the snow during turns.

5 Claims, 7 Drawing Figures

U.S. Patent    Jun. 29, 1982    Sheet 1 of 2    4,336,950

SLED

BACKGROUND OF THE INVENTION

This invention pertains to a sled having an improved steering and stopping apparatus.

The sled of the present invention utilizes skis instead of runners. Such a sled would normally experience sideslip if the skis were merely pivoted to effect a turn.

It is an object of the present invention to provide a sled having ski-type runners which tilt when the sled is being turned so that the skis bite into the surface of the snow.

SUMMARY OF THE INVENTION

Briefly, the sled of the present invention comprises a frame having means for supporting at least one rider. The sled is provided with a pair of front skis, one being disposed under each side of the frame. The front skis are supported by front and rear struts. The top portion of the front strut is rigidly affixed to the frame. Means is provided for connecting the bottom portion of the front strut to the ski in such a manner that the front portion thereof is capable of pivoting about the axis of the front strut and at the same time tilting about the longitudinal axis of the front ski. First strut support means is mounted on the frame for pivotal rotation about a first axis that is parallel to the longitudinal axis of the sled. The rear strut is suported by the strut support means. Means is provided for connecting the bottom portion of the rear strut to the ski in such a manner that the ski is capable of pivoting about the axis of the rear strut. Steering means is provided for causing the first strut support means to pivot about the first axis whereby the rear portion of the front ski swings to the side, and the bottom surface of the ski simultaneously tilts about its longitudinal axis.

In a preferred embodiment the sled includes a pair of rear skis which are supported by struts which are connected to the frame by second and third strut support means which are also pivotally mounted for rotation about the first axis. The second and third strut support means are connected to the first strut support means so that the rear skis tilt to substantially the same extent as the rear portion of the front skis.

DESCRIPTION OF THE PREFERRED EMBODIMENT

Figure 1:
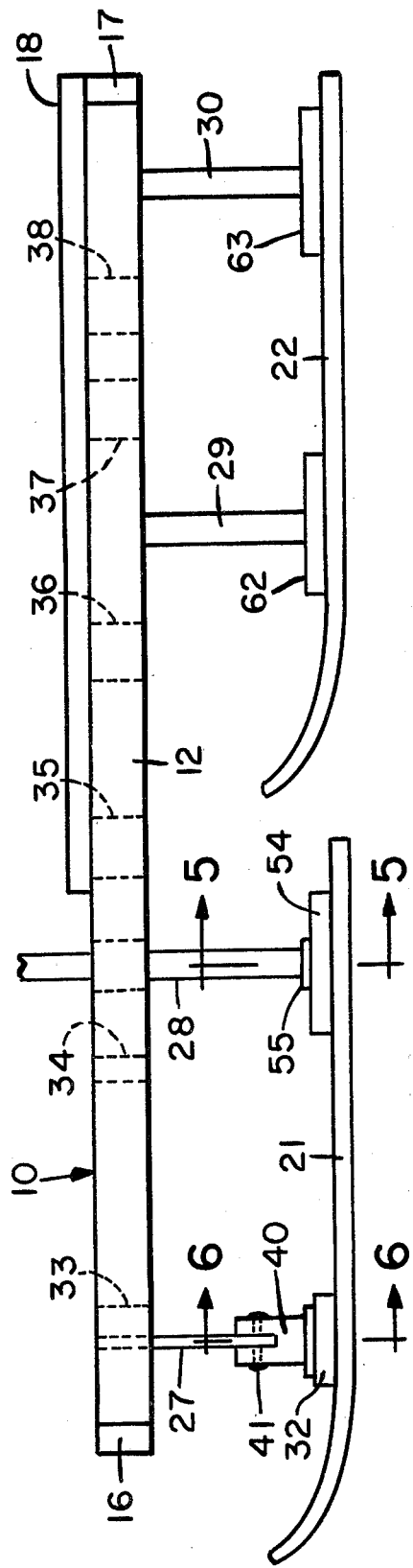
FIG. 1 is a side elevational view of a sled constructed in accordance with the present invention.
Figure 2:
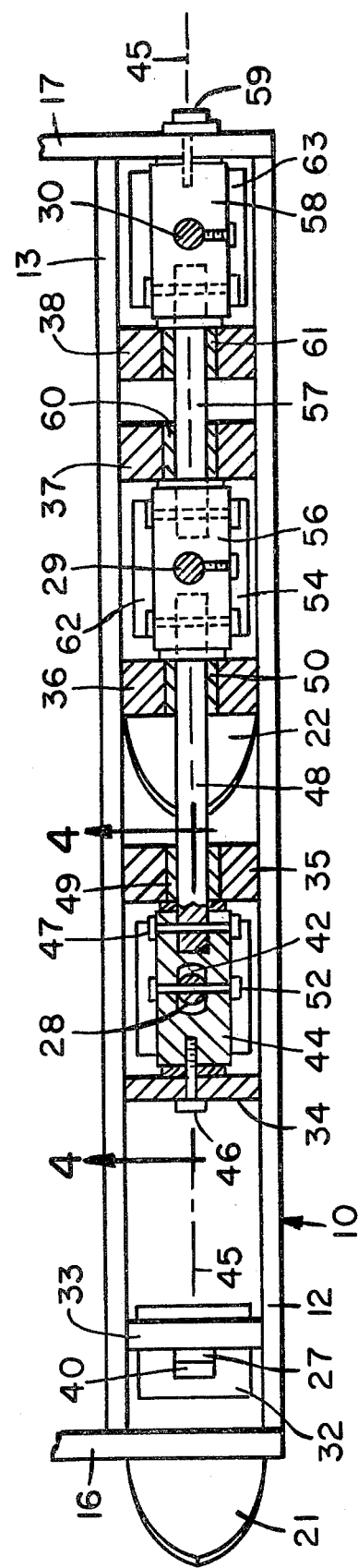
FIG. 2 is a plan view, in partial cross-section, of the left side of the sled of FIG. 1, platform 18 being omitted for the sake of clarity.
Figure 3:
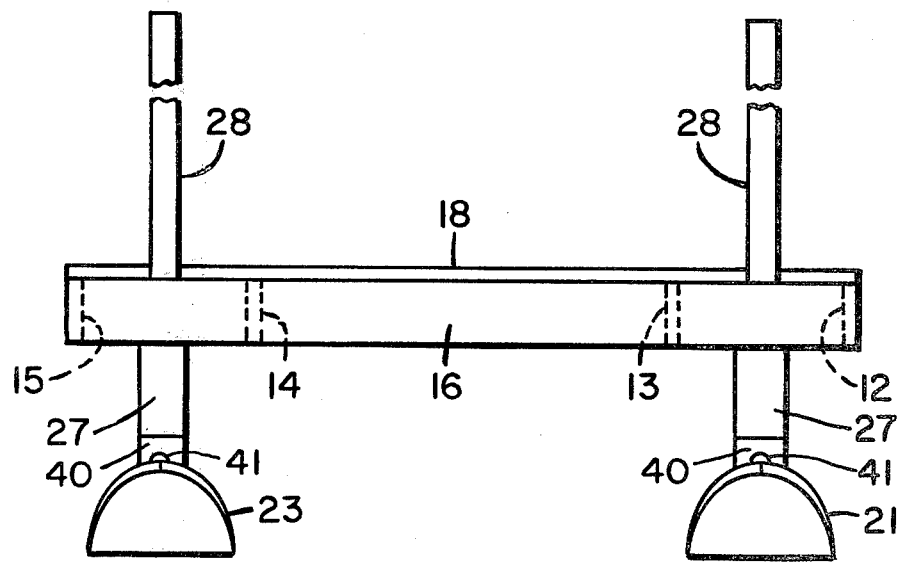
FIG. 3 is a front elevational view of the sled.

A preferred embodiment of the sled of the present invention is illustrated in FIGS. 1 through 3. A frame 10 comprises four longitudinal support members 12 through 15 which are secured together by front and rear support members 16 and 17, respectively. A platform 18 is secured to the rear portion of supports 12 through 15 and to rear support 17. Skis 21 and 22 are supported by members 12 and 13, and skis 23 and 24 are supported by members 14 and 15. Front skis 21 and 23 are attached to the frame by struts 27 and 28, and rear skis 22 and 24 are attached to the frame by struts 29 and 30. Each of the front struts 27 extends directly from a respective one of the short cross supports 33 which extends between pairs 12-13 and 14-15 of longitudinal support members. A plurality of short cross supports 34 through 38 function as braces to which structure for supporting struts 28 through 30 is mounted.

Figure 6:
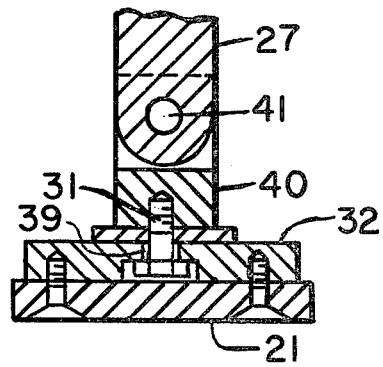
FIG. 6 is a cross-sectional view taken along lines 6—6 of FIG. 1.

The upper end of each strut 27 is rigidly connected to one of the cross supports 33. The lower end of each strut 27 is pivotally connected to mounting bracket 40 which is shown in enlarged cross-sectional view in FIG. 6. The lower end of bracket 40 is pivotally connected to the ski in such a manner that the front portion of the ski is capable of pivoting about the axis of strut 27. Collar bolt 31 connects plate 32 to bracket 40. Bushing 39 enhances the pivot-ability of plate 32 about bolt 31. Plate 32 is secured to the ski by means such as bolts. The upper end of bracket 40 has a slotted upper portion which receives the lower end of strut 27 for pivotal connection by pin 41. This connection permits the front end of the ski to pivot about pin 41 so that the bottom ski surface can tilt and assume an orientation other than parallel to the surface of the snow.

Figure 4:
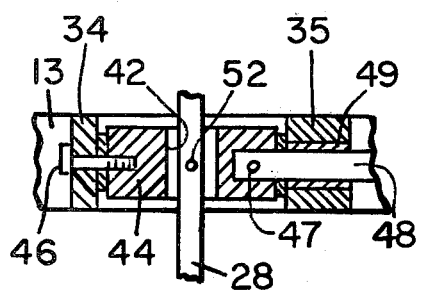
FIG. 4 is a cross-sectional view taken along lines 4—4 of FIG. 2.

The structure for supporting strut 28 is shown in cross-section in FIG. 1 and also in the cross-sectional view in FIG. 4. Strut 28 extends through an oval-shaped aperture 42 in strut support 44, which pivots about a longitudinal axis 45 that is parallel to the longitudinal axis of the sled. Collar bolt 46 is threaded at that end thereof which is inserted into a tapped bore in strut support 44. The collar portion of bolt 46 is free to rotate in a bore which extends through cross support 34. The opposite end of strut support 44 is provided with a bore into which shaft 48 is secured by means such as bolt 47. Shaft 48 rotates in bushings 49 and 50 which are located in cross supports 35 and 36, respectively. Strut 28 pivots about pin 52 which is orthogonally disposed with respect to axis 45.

Figure 5:
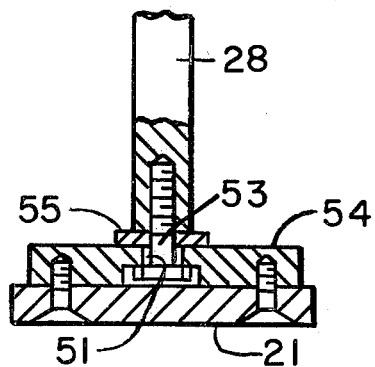
FIG. 5 is a cross-sectional view taken along lines 5—5 of FIG. 1.

The lower end of strut 28 is rotatably connected to ski 21 by the structure shown in the enlarged cross-sectional view in FIG. 5. Collar bolt 53 connects plate 54 to strut 28. Bolt 53 is threaded at that end thereof which is inserted into a tapped bore in strut 28. The plate 54 is rotatable about the collar portion of bolt 53, and this rotatable feature is enhanced by soft metal washer 55 and bushing 51. The rear portion of the ski is therefore capable of rotating about the axis of strut 28. Ski 29 is affixed by means such as bolts to plate 54.

The struts 29 and 30 for rear runners 22 and 24 may be fixedly mounted to cross supports in the same manner as struts 27 are mounted to cross supports 33. In such a embodiment the rear struts would always remain substantially perpendicular to platform 18, and the steering function would be accomplished soley by the front skis.

In accordance with the preferred embodiment, rear skis 22 and 24 follow the side-to-side movement of the rear portion of the front skis. This is accomplished by causing the rear ski struts 29 and 30 to track the lateral movement of struts 28. Shaft 48 is fixedly attached to strut support 56 so that it rotates along with strut support 44. In a similar manner a second shaft 57 connects strut support 56 to the rear strut support 58. A collar bolt 59 rotatably connects strut support 58 to rear cross member 17. Shaft 57 is rotatably mounted in bushings 60 and 61. Since struts 29 and 30 are not subjected to any back-and-forth motion, they are fixedly connected to strut supports 56 and 58 by means such as the illustrated set screws. The bottom ends of struts 29 and 30 are rigidly connected to the rear skis by way of plates 62 and 63, respectively.

Struts 28 may extend upwardly above the frame for a distance sufficient to permit one standing on platform 18 to grasp them and steer the sled. A steering linkage rod (not shown) could be pivotally connected to struts 28, and such a rod could be connected to a steering mechanism which could be manipulated by one sitting on platform 18.

Figure 7:
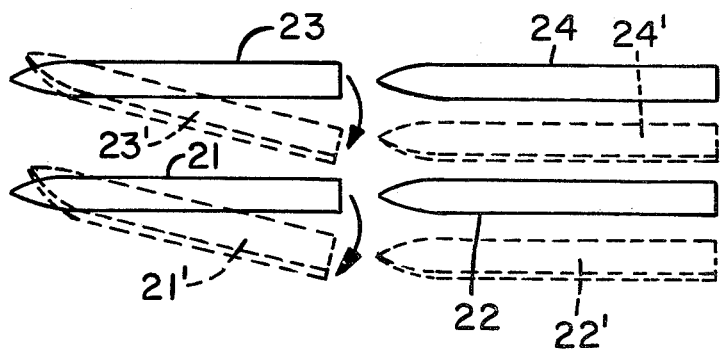
FIG. 7 is a schematic illustration of the change in position of the skis during a turn.

When the upper extensions of struts 28 are caused to be moved toward one side of the sled, the sled turns toward that side. The mechanical operation by which this occurs is as follows, reference being made to the illustration in FIG. 7. When those portions of struts 28 which extend above the frame move to the right, those struts pivot about axis 45 so that the bottom portions thereof move to the left. The rear portions of skis 21 and 23 also swing to the left as shown by the arrows whereby the front skis adopt the position represented by skis 21' and 23'. The front skis also tilt since the bottoms of the rear portions thereof are perpendicular to a line passing through their respective axes 45. This causes the front portions of the front skis to pivot about pins 41. The tilting of the front skis causes them to bite into the snow, thereby more readily accomplishing the turning function.

If the rear ski struts are coupled to strut 28 as illustrated in the embodiment of FIG. 2, rear skis 22 and 24 tilt along with the front skis and adopt the position illustrated by skis 22' and 24'. The rear skis therefore also bite into the snow whereby the possibility of side-slipping in a turn is reduced.

The speed of the sled can be decreased by moving the upper extensions of struts 28 toward each other, whereby the rear portions of both front skis swing outwardly.

I claim:
1. A sled comprising
a frame,
means on said frame for supporting at least one rider,
a pair of front skis, one disposed under each side of said frame at the front end thereof,
a front strut, the top portion of which is rigidly affixed to said frame,
means for connecting the bottom portion of said front strut to said ski in such a manner that the front portion thereof is capable of pivoting about the axis of said front strut and is capable of tilting about the longitudinally axis thereof,
a rear strut,
first strut support means mounted on said frame for pivotal rotation about a first axis that is parallel to the longitudinal axis of said sled, said first strut support means supporting said rear strut,
means for connecting the bottom portion of said rear strut to said ski in such a manner that said ski is capable of pivoting about the axis of said rear strut, and
steering means for causing said strut support means to pivot about said first axis whereby the rear portion of said front ski swings to the side and the bottom surface of said ski tilts about its longitudinal axis.

2. A sled in accordance with claim 1 wherein said steering means comprises an extension of said rear strut above said frame.

3. A sled in accordance with claim 1 further comprising
a pair of rear skis,
second and third strut support means mounted on said frame for pivotal rotation about said first axis,
second and third rear struts connecting each said rear ski to said second and third strut support means, respectively, and
means for connecting said second and third strut support means to said first strut support means so that said three strut support means pivot in unison.

4. A sled in accordance with claim 3 wherein said means for connecting said second and third strut support means comprises first and second shafts mounted for rotation about said first axis, the ends of said first shaft being rigidly connected to said first and second strut support means and the ends of said second shaft being rigidly connected to said second and third strut support means.

5. A sled in accordance with claim 4 wherein said steering means comprises an extension of said rear strut above said frame.

* * * * *